United States Patent Office 3,053,826
Patented Sept. 11, 1962

3,053,826
COPPER COMPLEX OF A MONOAZO DYE CONTAINING A DICHLORO-TRIAZINE SUBSTITUENT
Alistair Howard Berrie and Cyril Eric Vellins, Manchester, England, assignors to Imperial Chemical Industries Limited, London, England, a corporation of Great Britain
No Drawing. Filed May 4, 1960, Ser. No. 26,690
Claims priority, application Great Britain May 20, 1959
1 Claim. (Cl. 260—146)

This invention relates to new azo dyestuffs and more particularly it relates to new metal-containing azo dyestuffs which are valuable for colouring cellulose textile materials.

According to the invention there are provided as new metal-containing azo dyestuffs the copper complexes of the azo compounds which, in the form of the free acids, are represented by the formula:

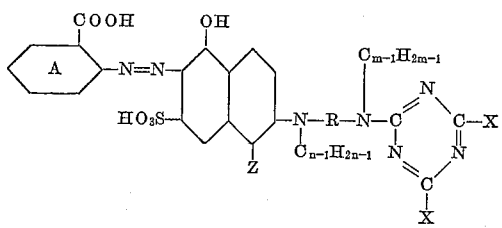

where R represents a phenylene or sulphophenylene radical, X represents a chlorine or a bromine atom, Z represents a hydrogen atom or a sulpho group $m$ and $n$ each represent an integer and can be the same or different, and the benzene ring A may carry further substituents, provided that the azo compounds contain at least 2 sulphonic acid groups.

As examples of further substituents which may be present in the benzene ring A there may be mentioned sulpho, carboxy, halogeno for example chloro or bromo, nitro, acylamino for example acetylamino, sulphamoyl, alkoxy for example methoxy, aroyl for example benzoyl, trifluoromethyl, N:N-dialkylsulphamoyl for example N:N-dimethylsulphamoyl, N-alkylsulphamoyl for example N-methylsulphamoyl and alkylsulphonyl for example methylsulphonyl.

The symbols $m$ and $n$ in the above formula preferably represent integers of from 1 to 5 so that the groups —$C_{m-1}H_{2m-1}$ and —$C_{n-1}H_{2n-1}$ each represent an alkyl group of from 1 to 4 carbon atoms, or preferably when $m$ and $n$ are 1 they each represent a hydrogen atom.

According to a further feature of the invention there is provided a process for the manufacture of the new metal-containing azo dyestuffs, as hereinbefore defined, which comprises reacting a metallisable azo compound of the formula:

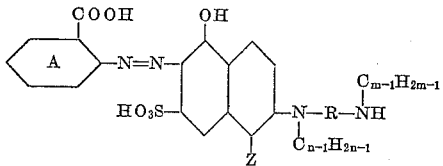

wherein A, R, Z, $m$ and $n$ have the meanings stated above, provided that the metallisable azo compound contains at least 2 sulphonic acid groups, with a coppering agent and with cyanuric chloride or with cyanuric bromide.

The metallisable azo compound may be reacted with the cyanuric chloride or cyanuric bromide and the compound so obtained reacted with the coppering agent, but it is preferred to react the metallisable azo compound with the coppering agent and subsequently to react the copper complex so obtained with the cyanuric chloride or cyanuric bromide.

The treatment of the metallisable azo compound with the coppering agent may be carried out by any of the methods known for perparing copper complexes of azo dyestuffs, for example by heating an aqueous solution of the metallisable azo compound and the coppering agent.

The treatment of the copper complex of the metallisable azo compound may be conveniently carried out by adding an aqueous solution of the copper complex to a suspension of the cyanuric chloride or cyanuric bromide in water or in a mixture of water and a water-miscible organic liquid, for example acetone, preferably at a temperature of between 0° and 5° C., adding sodium carbonate to maintain the pH of the mixture between 6 and 7 and filtering off the metal-containing azo dyestuff which is formed. If desired sodium chloride can be added to ensure complete precipitation of all the said dyestuff.

The metallisable azo compounds used in the process of the invention may be obtained by diazotising an amine of the formula:

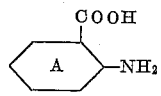

wherein A has the meaning stated above, and coupling the diazo compound so obtained with a coupling component of the formula:

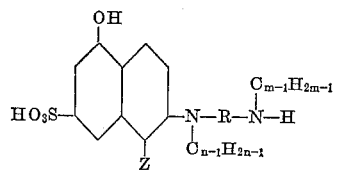

wherein R, Z, $m$ and $n$ have the meanings stated above, the amine and the coupling component being so chosen that the resulting metallisable azo compound contains at least 2 sulphonic acid groups.

As examples of amines of the above formula which may be used to obtain the metallisable azo compounds used in the process of the invention there may be mentioned anthranilic acid, 4- or 5-sulphoanthranilic acid, 2-aminoterephthalic acid, 4- or 5-chloroanthranilic acid, 3-, 4- or 5-nitroanthranilic acid, 4- or 5-bromoanthranilic acid, 4-, or 5-acetylaminoanthranilic acid, 4-methoxyanthranilic acid, 4-benzoylanthranilic acid, 4-trifluoromethylanthranilic acid, 4-sulphamoylanthranilic acid, 4-N-methylsulphamoylanthranilic acid, 4-N:N-dimethylsulphamoylanthranilic acid and 4-methanesulphoyl anthranilic acid.

As examples of coupling components of the above formula which may be used to obtain the metallisable azo compounds used in the process of the invention there may be mentioned 2-(3'- or 4'-aminophenylamino)-5-naphthol-7-sulphonic acid, 2-(3'- or 4'-aminophenylamino)-5-naphthol-1:7-disulphonic acid, 2-(3'-amino-4'-sulphophenylamino)-5-naphthol-7-sulphonic acid and 2-(4'-amino-3'-sulphophenylamino)-5-naphthol-7-sulphonic acid.

It is preferred to isolate the new metal-containing azo dyestuffs, as hereinbefore defined, from the media in which they have been formed at a pH from 6 to 8 and it has been found that the loss of halogen from the triazine ring present in the dyestuffs can be reduced considerably by addition of buffering agents which give a pH value between 6 and 8 and in particular by those which give a pH of about 6.5. As examples of such buffering agents there may be mentioned mixtures of disodium hydrogen phosphate and sodium dihydrogen phosphate or potassium dihydrogen phosphate and mixtures of sodium diethylmetanilate and sodium hydrogen sulphate. The buffering agents may be added at any time during the manufacture of the said azo dyestuffs but it is preferred to add the buffering agents to the reaction mixture prior to the isolation of the azo dyestuff and subsequently to mix the dyestuff paste with more of the buffering agent before drying the dyestuff paste, which is preferably carried out at a temperature below 65° C. The dried dyestuff compositions so obtained are frequently more stable than the unbuffered dried dyestuffs.

The new metal-containing azo dyestuffs, as hereinbefore defined, in the form of their alkali metal salts, are readily soluble in water. They are especially valuable for the colouration of cellulose textile materials and for colouring such textile materials they are preferably applied to the cellulose textile material in conjunction with a treatment with an acid-binding agent, for example sodium carbonate, which may be applied to the cellulose textile material before, during or after the application of the dyestuff. When so applied to cellulose textile materials the new metal-containing azo dyestuffs yield bluish-red shades possessing excellent fastness to light and to wet treatments such as washing.

A preferred class of the new metal-containing azo dyestuffs of the invention are the copper complexes of the azo compounds which, in the form of the free acids, are represented by the formula:

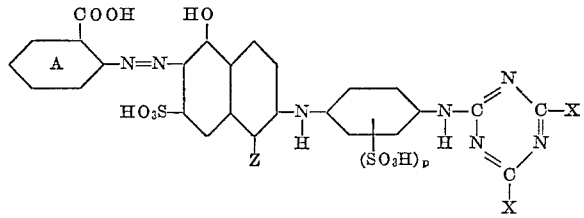

wherein, A, Z and X have the meanings stated above and $p$ represents 0 or 1, provided that the azo compounds contain at least 2 sulphonic acid groups. It is however preferred that Z represents a sulphonic acid group and/or $p$ represents 1. In this preferred class X preferably a chlorine atom.

The invention is illustrated but not limited by the following examples in which the parts and percentages are by weight:

*Example 1*

Diazotised anthranilic acid is coupled with one molecular proportion of 2-(4'-amino-3'-sulphophenylamino)-5-naphthol-7-sulphonic acid under alkaline conditions and the azo compound so obtained is converted to the copper complex by heating it with an aqueous solution of copper sulphate containing acetic acid for 10 minutes at a temperature of 80° C.

A solution of 6.38 parts of the above copper complex in 250 parts of water is treated with sodium carbonate until the pH of the solution is 7.0 and the solution so obtained is added with stirring to a suspension of 2.03 parts of cyanuric chloride in a mixture of 25 parts of water and 25 parts of ice. The mixture is then stirred for 2½ hours, the temperature of the mixture being maintained between 0° and 5° C. by external cooling and the pH of the mixture being maintained between 6 and 7 by the addition of a 5% aqueous solution of sodium carbonate. 30 parts of sodium chloride are then added and the dyestuff which is precipitated is filtered off and the dyestuff paste so obtained is mixed with 0.5 part of disodium hydrogen phosphate and 0.9 part of potassium dihydrogen phosphate and is then dried at a temperature of 20° C.

On analysis the dyestuff composition so obtained is found to contain 1.92 atoms of organically bound chlorine for each azo molecule.

When applied to cellulose textile materials in conjunction with a treatment with an acid-binding agent the new dyestuff yields rubine shades possessing excellent fastness to light and to wet treatments such as washing.

The following table gives further examples of the new metal-containing azo dyestuffs of the invention which are obtained by replacing the 6.38 parts of the copper complex used in Example 1 by an equivalent amount of the copper complexes which are obtained by diazotising the amine listed in the second column of the table, coupling the diazo compound so obtained with the coupling component listed in the third column of the table and heating the aminomonoazo compound so obtained with an aqueous solution of copper sulphate containing a little acetic acid. The fourth column of the table indicates the shades obtained when the dyestuffs are applied to cellulose textile materials in conjunction with a treatment with an acid-binding agent.

| Example | Amine | Coupling Component | Shade obtained on cellulose textile material |
|---|---|---|---|
| 2 | anthranilic acid | 2-(4'-aminophenylamino)-5-naphthol-1:7-disulphonic acid. | Reddish-violet. |
| 3 | do | 2-(3'-amino-4'-sulphophenyl-amino)-5-naphthol-7-sulphonic acid. | Red. |
| 4 | do | 2-(4'-amino-3'-sulphophenyl-amino)-5-naphthol-1:7-disulphonic acid. | Bluish-red. |
| 5 | 4-sulphoanthranilic acid. | do | Do. |
| 6 | 5-nitroanthranilic acid. | do | Bluish-violet. |
| 7 | 4-chloroanthranilic acid. | do | Bluish-red. |
| 8 | 4-trifluoromethyl-anthranilic acid. | do | Do. |
| 9 | 5-nitro-2-amino-terephthalic acid. | do | Violet. |
| 10 | 4-benzoylamino-thranilic acid. | do | Bluish-red. |
| 11 | 5-acetylaminoan-thranilic acid. | do | Do. |
| 12 | 4-sulphamoylan-thranilic acid. | do | Do. |

What we claim is:
The compound of the formula

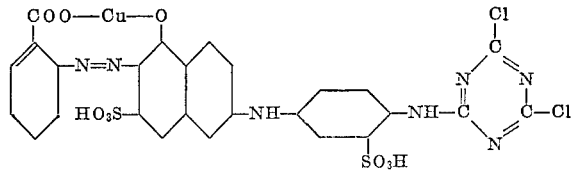

References Cited in the file of this patent
UNITED STATES PATENTS

| 2,873,269 | Fasciati et al. | Feb. 10, 1959 |
| 2,929,809 | Menzi et al. | Mar. 22, 1960 |
| 2,943,084 | Buehler et al. | June 28, 1960 |
| 2,957,862 | Riat et al. | Oct. 25, 1960 |